US011922456B1

(12) United States Patent
Crider et al.

(10) Patent No.: US 11,922,456 B1
(45) Date of Patent: Mar. 5, 2024

(54) ADVERTISING ANALYSIS USING DATA CLEAN ROOMS

(71) Applicant: Amazon Technologies, Inc., Seattle, WA (US)

(72) Inventors: Anthony Crider, Longmont, CO (US); Hariharan Jayaraman, Oakville (CA); Nicole Landis Ferragonio, Scotch Plains, NJ (US); Alan Kerry Lewis, Erie, CO (US); Keerat Singh Sharma, Longmont, CO (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/954,758

(22) Filed: Sep. 28, 2022

(51) Int. Cl.
*G06Q 30/02* (2023.01)
*G06Q 30/0242* (2023.01)

(52) U.S. Cl.
CPC .................. *G06Q 30/0246* (2013.01)

(58) Field of Classification Search
CPC ................................. G06Q 30/0246
See application file for complete search history.

(56) References Cited

U.S. PATENT DOCUMENTS

| | | | |
|---|---|---|---|
| 11,151,447 B1 | 10/2021 | Chen et al. | |
| 11,347,886 B1 * | 5/2022 | Langseth | H04L 63/0428 |
| 11,567,943 B1 * | 1/2023 | Langseth | G06F 16/2443 |
| 2018/0349384 A1 | 12/2018 | Nerurkar et al. | |
| 2020/0014691 A1 * | 1/2020 | Ortiz | H04L 9/3234 |
| 2023/0004669 A1 * | 1/2023 | Langseth | G06F 16/27 |
| 2023/0004670 A1 * | 1/2023 | Langseth | H04L 67/10 |

OTHER PUBLICATIONS

Acharya, J., et al. "Context-Aware Differential Privacy," Proceedings of the 37th Int'l Conf. on Machine Learning (2020), PMLR 119:52-62, 11 pages.
Bassily, R., et al. "Private Query Release Assisted by Public Data," Proceedings of the 37th Int'l Conf. on Machine Learning (2020), PMLR 119:695-703, 9 pages.
Dwork, C. and Roth, A. "The Algorithmic Foundations of Differential Privacy," Foundations & Trends in Theoretical Computer Science, vol. 9, Nos. 3-4 (2014), pp. 211-407, 281 pages.

(Continued)

*Primary Examiner* — Breffni Baggot
(74) *Attorney, Agent, or Firm* — Athorus, PLLC

(57) ABSTRACT

Data clean rooms provided for subscribers to advertising analysis services include data regarding advertising impressions, selections, view or conversion events, and memberships of audience segments, and computing functions or capacities for processing the data in an anonymized fashion. When advertisements are presented to customers, and interactions by customers (e.g., impressions, views, clicks, conversions or others) with goods or services are detected, data regarding the interactions may be aggregated and stored. When queries on behalf of an advertiser are identified, data associated with the queries may be retrieved and stored in a data clean room for processing or analysis. Anonymized responses to the query may be returned to the customer or serve as basis for one or more advertising events.

20 Claims, 12 Drawing Sheets

(56) References Cited

OTHER PUBLICATIONS

Phan, NH., et al. "Scalable Differential Privacy with Certified Robustness in Adversarial Learning," Proceedings of the 37th Int'l Conf. on Machine Learning (2020), PMLR 119:7683-7694, 12 pages.

Triastcyn, A. and Faltings, B., "Bayesian Differential Privacy for Machine Learning," Proceedings of the 37th Int'l Conf. on Machine Learning (2020), PMLR 119:9583-9592, 10 pages.

* cited by examiner

ADVERTISING ANALYSIS USING DATA CLEAN ROOMS

BACKGROUND

In marketing and advertising, the term "attribution" typically refers to a process of identifying an action, or a sequence of actions, that influenced a consumer's decision to execute a transaction involving a good or a service that was the subject of at least one advertisement. Where a consumer has been exposed, or may have been exposed, to one or more advertisements or marketing initiatives, one central purpose of attribution is to identify specific advertisements that deserve credit for a transaction, and to appropriately allocate credit to each advertisement accordingly. When an advertisement successfully encourages a consumer to take a desired action, such as to execute a transaction for one or more goods or services, this effect is known as a conversion.

Advertising is an integral aspect of commerce, both in the virtual space and in the traditional bricks-and-mortar space. Advertisements that appeal to each of our five senses may be found in seemingly any location, and in every phase of everyday life for consumers. On any given day, a consumer may be exposed to advertisements that are fixed to structures such as buildings, bridges, or free-standing billboards, or emblazoned on or within buses, trains or other vehicles. Consumers may also observe advertisements that are printed in newspapers, magazines or other media, view or hear advertisements that are broadcasted over television or radio airwaves, or browse over or through advertisements that are displayed in association with pages of network sites or applications, or embedded in electronic messages. Advertisements may also be presented to consumers in any other manner.

Historically, attributions of conversions through electronic transactions were made in a simple manner. For example, where a consumer visits a network page (e.g., a web page) displaying an advertisement for an item, or opens an electronic message (e.g., a text message, a social network message or an E-mail) that includes the advertisement for the item, and ultimately selects the advertisement or purchases the item, a conversion may be attributed to the advertisement displayed on the web page or the advertisement included in the electronic message. Similarly, when an audio or video advertisement is broadcast on radio or television, and an item is purchased shortly thereafter by a consumer who may be reasonably assumed to have heard or viewed the advertisement, a conversion may be attributed to the advertisement with a high degree of confidence.

Because today's consumers are subject to constant bombardment of advertising efforts in any number of forums, the task of accurately attributing purchases of goods or services to individual advertisements can be quite challenging. Predicting which advertisement of a plurality of advertisements, if any, deserves a lion's share of credit for a purchase is typically an exercise in guesswork. Moreover, with the widespread proliferation of mobile technology and improvements in Internet connectivity, consumers may also complete transactions for items at any time, on any day, and from any location. As electronic commerce becomes more widespread, traditional models for attributing conversions have become obsolete.

Moreover, in recent times, the proliferation of electronic commerce has led to a greater recognition of the value of customer privacy. For example, where interactions with advertisements occur in electronic settings, such as an electronic marketplace having access to information regarding large numbers of customers, and larger numbers of items available from advertisers, preserving the privacy of customers who have purchased items from an advertiser (or other advertisers) through the electronic marketplace is of paramount importance.

DETAILED DESCRIPTION

Figure 1A:
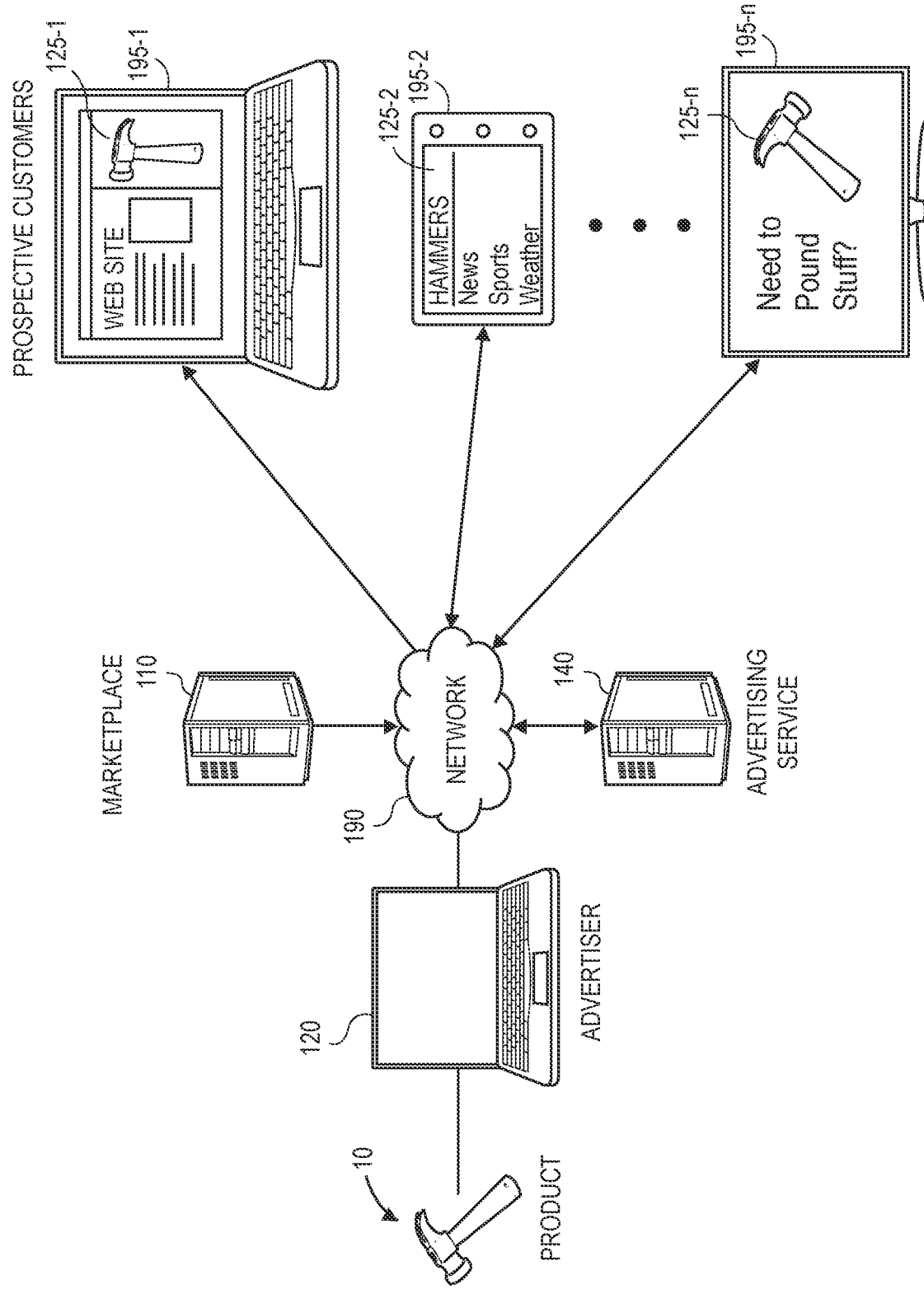
FIGS. 1A through 1G are views of aspects of one system for advertising analysis in accordance with embodiments of the present disclosure.

As is set forth in greater detail below, the present disclosure is directed to techniques for advertising analysis that rely on the use of data clean rooms (or, simply, clean rooms). One or more implementations of the present disclosure may enable manufacturers, merchants, sellers, vendors or other users to generate reports or other information or data regarding advertising and shopping that is both aggregated and anonymized.

In some implementations, insights into advertising activities and shopping records for products that an advertiser advertises electronically may be obtained more readily, as sales patterns may be aggregated across advertisements presented to customers in multiple formats, and based on transactions for goods or services across multiple platforms.

The systems and methods of the present disclosure enable users to process data regarding interactions with advertisements presented to customers (or prospective customers) using a number of tools. Such data may represent, for example, advertising impressions, online selections (or "clicks"), view events or conversion events that may be attributed to one or more advertisements presented to audiences, and segments of the audiences that viewed the advertisements. The data may be processed within one or more "clean" environments by structured query language (or "SQL") engines, machine learning algorithms, or in any other manner. In some implementations, data may be processed according to SQL queries that are generated by users, or selected from one or more templates, such as instructional queries. Alternatively, data may be processed according to queries that are automatically generated. Moreover, in some implementations, the data may be processed according to one or more machine learning algorithms that are selected or trained by the advertisers, The systems and methods of the present disclosure may be utilized by direct advertisers, or brands or entities that provide advertisements on their own behalf directly, as well as by advertising agents or agencies, who provide advertising services for multiple brands or entities. In some implementations, users of the systems and methods disclosed herein may respond to queries based on data regarding advertising campaigns across multiple modes or platforms, e.g., television, online, or elsewhere. In some other implementations, users of the systems and methods disclosed herein may identify audience segments that convert at high rates, or audience segments that are inexpensive to reach, regardless of the modes or platforms on which such users advertise goods or services.

Moreover, in some implementations, the systems and methods of the present disclosure may include a number of features or aspects for preserving the privacy of data of customers who interacted with goods or services, or customers to whom advertisements for the goods or services were presented. Data clean rooms of the present disclosure may act in response to queries made by or on behalf of advertisers, and may govern outputs identified in response to such queries in an effort to avoid compromising privacy or unnecessarily divulging private information in outputs identified based on such queries, regardless of a size or scope of a dataset on which the queries are run.

Referring to FIGS. 1A through 1G, views of aspects of one system 100 for advertising analysis in accordance with implementations of the present disclosure are shown. As is shown in FIG. 1A, the system 100 includes a marketplace (e.g., an electronic marketplace, or an online marketplace) 110, an advertiser 120, an advertising service 140 and a plurality of computer devices 195-1, 195-2 . . . 195-n associated with prospective customers that are connected to one another over one or more networks 190, which may include the Internet in whole or in part.

The marketplace 110 may be any electronic forum maintained by an entity or individual that wishes to make items from a variety of sources available for download, purchase, rent, lease or borrowing by customers using a networked computer infrastructure, e.g., one or more servers, data stores, or other components for maintaining a network site (e.g., a web site) that may be accessible to one or more customers. The advertiser 120 may be any entity that presents advertisements for one or more goods or services to potential customers in any manner, such as on network pages. For example, the advertiser 120 may be a direct advertiser, e.g., a manufacturer, a merchant, a seller, a vendor, or another entity, that presents advertisements for its own goods or services to customers. Alternatively, the advertiser 120 may be an advertising agent or agency that contracts with or is instructed by one or more entities to present advertisements for goods or services of such entities to customers in any manner.

The computer devices 195-1, 195-2 . . . 195-n may be any computer devices or systems that are configured to access information or data regarding products that are available for download, purchase, rent, lease or borrowing from the marketplace 110 or from any other entities, such as by accessing one or more network pages or operating a dedicated application, or receiving any other content in any other manner. The computer device 195-1 is a laptop computer, while the computer device 195-2 is a tablet computer, and the computer device 195-n is a television. Alternatively, any other device that may access the network 190 and receive content including one or more advertisements may be utilized with implementations of the present disclosure.

The advertising service 140 may be any device or system configured to receive, generate or transmit information or data regarding advertisements for one or more goods or services as well as sales of such goods or services, or any other information or data regarding the advertisements or the goods or services, on behalf of one or more advertisers, such as the advertiser 120. In some implementations, as is shown in FIG. 1A, the advertising service 140 may generate advertisements 125-1, 125-2 . . . 125-n for a product 10 (viz., a hammer) of the advertiser 120, and cause such advertisements to be displayed to customers on the computer devices 195-1, 195-2 . . . 195-n. For example, the advertisements 125-1, 125-2 . . . 125-n may be static or standard banner advertisements, animated advertisements, interactive advertisements, video advertisements, expandable advertisements, interstitial advertisements, or other visual content describing or referencing the product 10 that may be presented to users on displays of the respective devices 195-1, 195-2 . . . 195-n.

Figure 1B:
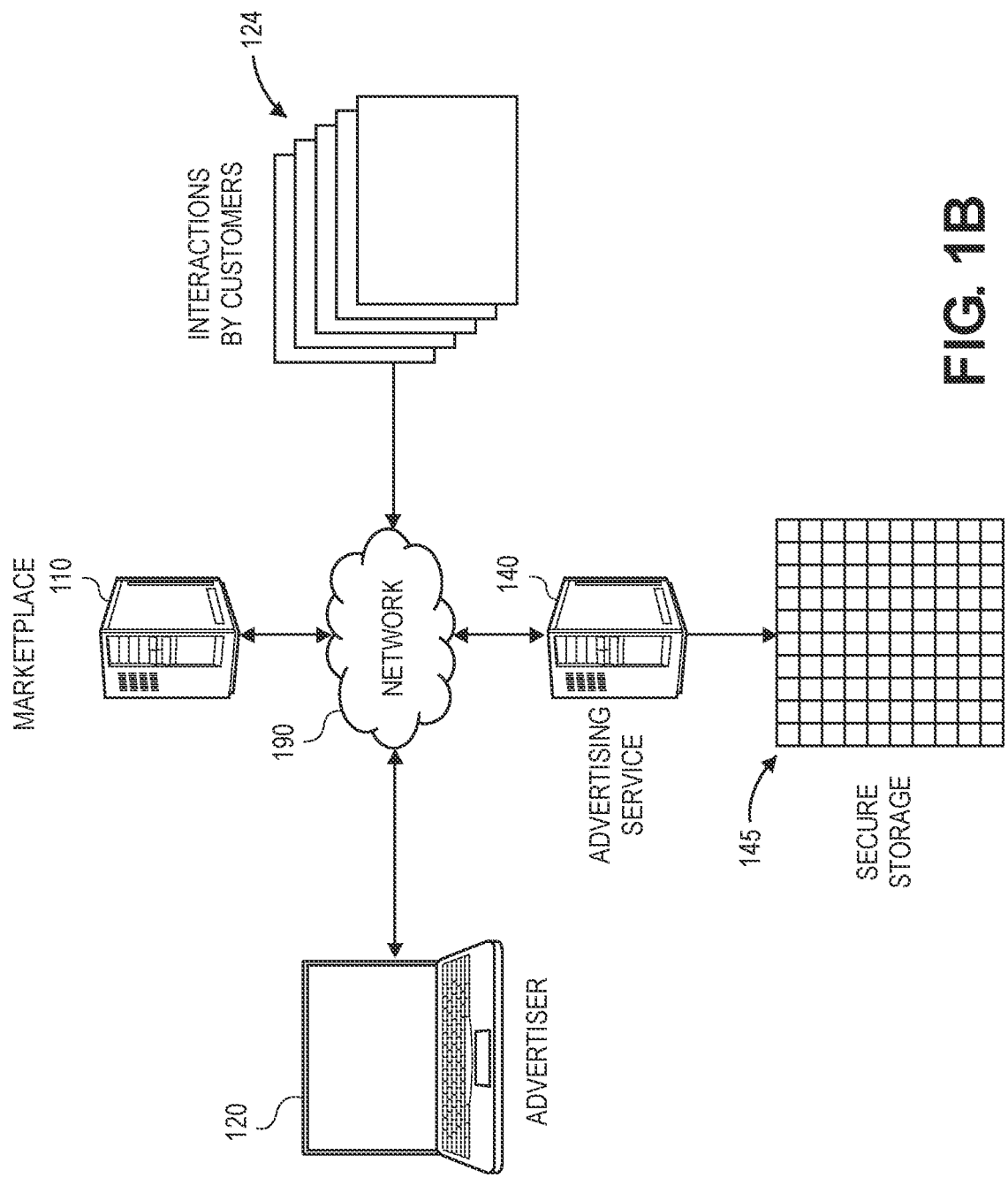

As is shown in FIG. 1B, the advertising service 140 may also receive information or data regarding interactions 124 by customers during or after having viewed the advertisements 125-1, 125-2 . . . 125-n. Such interactions may include, but need not be limited to, impressions of the advertisements 125-1, 125-2 . . . 125-n, as well as clicks or selections of the advertisements 125-1, 125-2 . . . 125-n, conversion events attributed to one or more of the advertisements 125-1, 125-2 . . . 125-n, views of information regarding products referenced in the advertisements 125-1, 125-2 . . . 125-n, e.g., the product 10, additions of a product to a virtual shopping cart or registry, or any other information or data. The information or data regarding the interactions 124 may also identify customers that executed the interactions 124, e.g., by name, address, electronic mail address, or any other identifier, as well as a category, type or subtype of each of the interactions 124, an identifier of the product 10 (e.g., a product number), a date or time of each of the interactions 124, or the like.

The information or data regarding the interactions 124 may be stored in a secure storage 145 by the advertising service 140, e.g., in one or more rows or columns of a table, a spreadsheet, a database, or any other file or record, along with a schema, a package, or any other objects, files or records. The information or data regarding the interactions 124 may be stored in any format, such as in one or more text files, Comma-Separated Value (or ".CSV") files, Protocol Buffer (or "protobuf," or ".proto") files, JavaScript Object Notation (or ".JSON") files, JSON Lines files, or others.

Figure 1C:
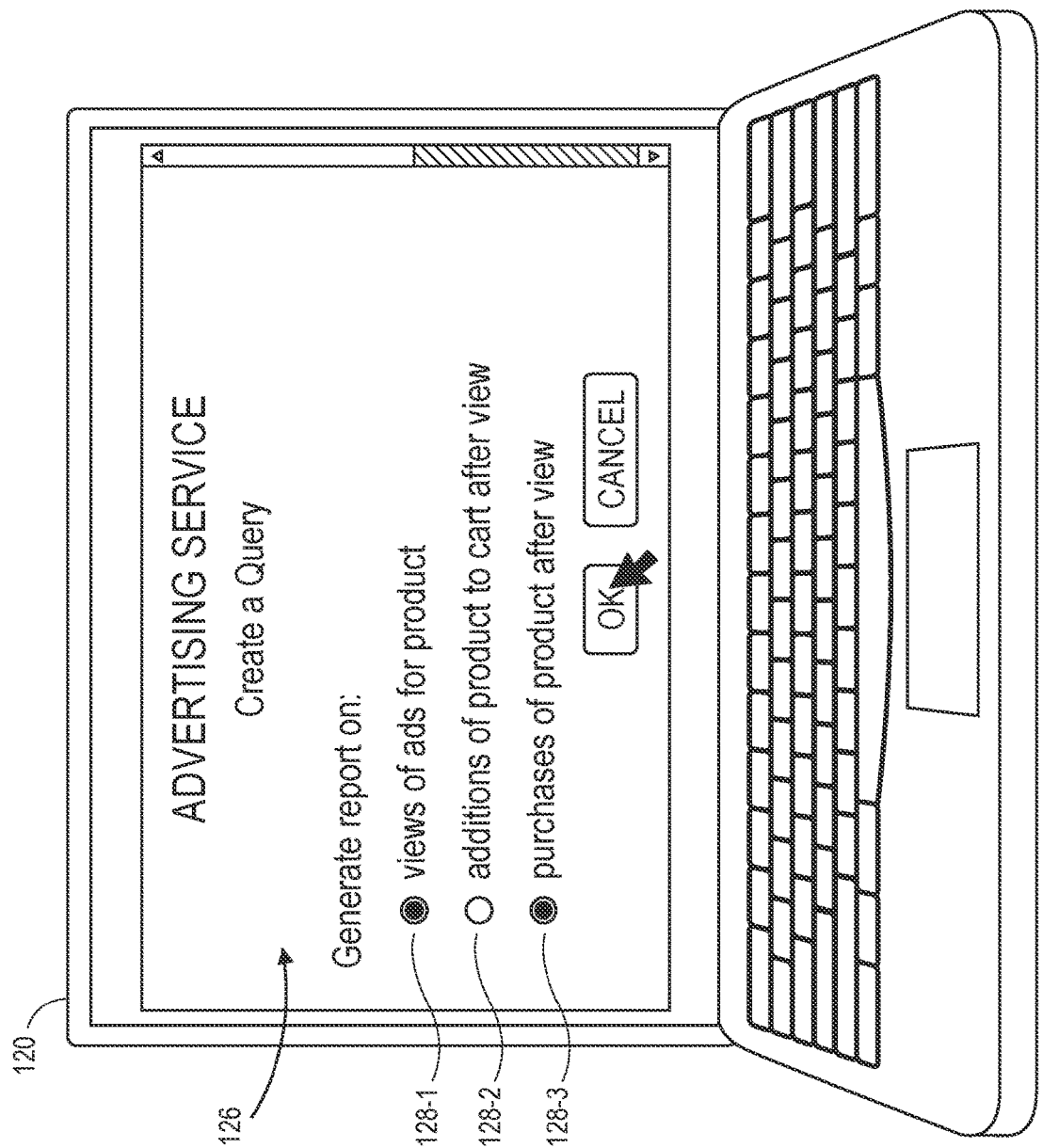

As is shown in FIG. 1C, the advertiser 120 may provide a query for information or data regarding interactions by customers who viewed the advertisements 125-1, 125-2 . . . 125-n, e.g., by providing criteria in one or more statements that specify fields or names of locations of data or types of data, as well as any clauses, selection criteria, conditions or other limitations. For example, the advertiser 120 may display a user interface including one or more selectable features (e.g., radio buttons, check boxes or others) corresponding to terms 128-1, 128-2, 128-3 of a query that may be manipulated by the advertiser 120 to generate reports on views of the advertisements 125-1, 125-2 . . . 125-n for the product 10 by customers, as well as additions of the product 10 to a virtual shopping cart or another record (e.g., a registry), or purchases of the product 10, that followed a viewing of one of the advertisements 125-1, 125-2 . . . 125-n.

Alternatively, or additionally, the user interface may include one or more radio buttons or one or more text boxes for selecting statistical queries, transactional queries, marginal queries, or specifying any other features, columns or other sets of data to be considered in answering a query. Likewise, the user interface may also include one or more radio buttons or other interactive features for selecting columns or other sets of data to be considered in answering the queries.

As is shown in FIG. 1C, the advertiser 120 has selected the feature corresponding to a term 128-1 for views of the advertisements 125-1, 125-2 . . . 125-n, as well as the feature corresponding to a term 128-3 corresponding to a request for purchase of the product 10 following a view of one of the advertisements 125-1, 125-2 . . . 125-n.

Figure 1D:
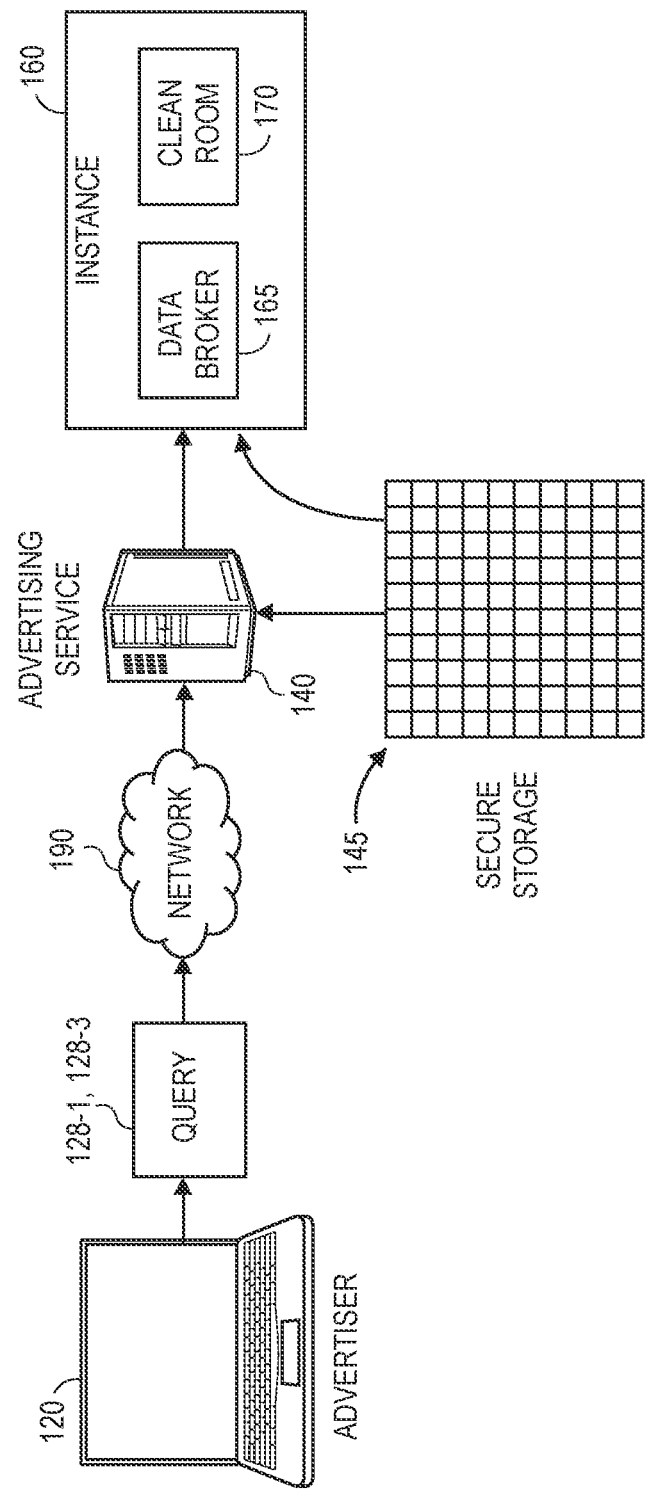

As is shown in FIG. 1D, after the advertiser 120 has selected the features corresponding to the terms 128-1, 128-3, information regarding a query based on the terms 128-1, 128-3 is transmitted to the advertising service 140 over the one or more networks 190. Additionally, the advertising service 140 transfers data associated with the advertiser 120 to an instance 160 of the advertiser 120, which includes a data broker 165 and a data clean room 170 (or, simply, a clean room). The data broker 165 facilitates transfer of data into the clean room 170, which is a container for advertiser-scoped data along with infrastructure for executing one or more processes such as aggregations of data, modeling of audiences, or others. In some implementations, the data broker 165 may hold an identity graph that maps customer identifiers along with an identifier of the advertiser 120 to a key space of the advertiser 120. The clean room 170 may utilize a unique key space that is not shared with any instance of any other advertiser (not shown).

In some implementations, the query may be generated according to the terms 128-1, 128-3 in structured query language (or "SQL"), or in any other language. For example, the query may identify locations of the data, viz., within the secure storage 145 or the clean room 170, and filter or aggregate the data before returning the data, which may be sorted as specified in the query. The query may include a statement having a "select" clause identifying columns of data to be searched in accordance with the query, followed by a "from" clause identifying one or more tables or other sets of data where such columns are located. The query may also include an aggregate function, such as "count," "sum," "average," "minimum," "maximum," or others. The query may further include any other operators for identifying numbers or counts from the data that are responsive to the terms 182-1, 182-3, e.g., "group by," or for otherwise updating or interacting with the data within the secure storage 145 or the clean room 170.

Figure 1E:
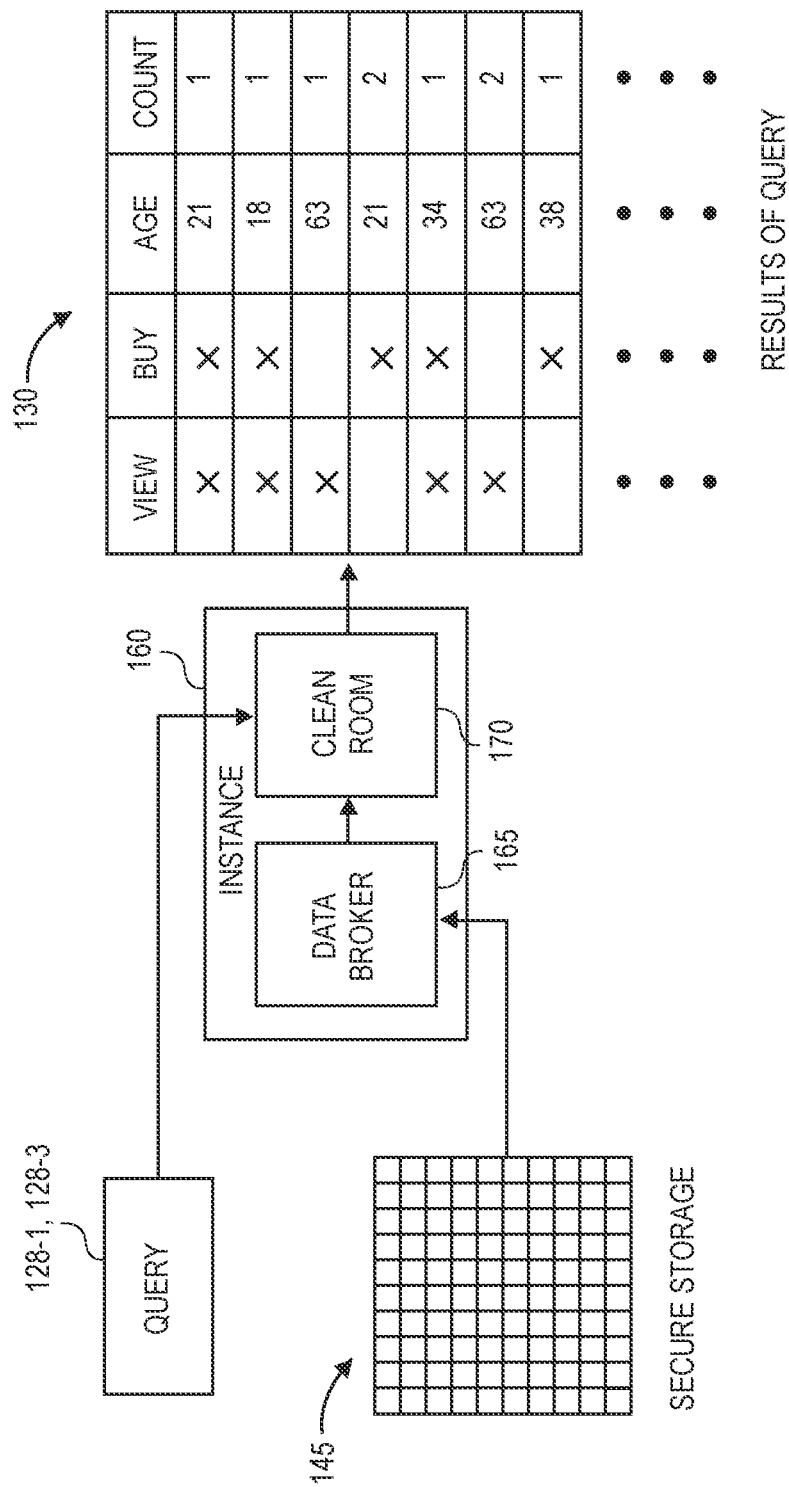

As is shown in FIG. 1E, the query is executed according to the terms 128-1, 128-3 on data in the secure storage 145 that is keyed to the advertiser 120, and a set of results 130 is identified within the clean room 170 based on the terms 128-1, 128-3. For example, because the terms 182-1, 182-3 include requests for data regarding customers who have viewed advertisements for the product 10, and customers who have purchased the product 10 after viewing the advertisements, the sets of results 130 identify customers and personal information regarding the customers, e.g., their respective ages. Alternatively, any other personal information regarding the customers may be included in the sets of results, such as street addresses, identifiers of payment instruments (e.g., credit cards or bank cards), or purchase histories of the customers, or any other information or data that may be considered private, e.g., identifiers of their personal backgrounds (such as marital statuses, military service data, races or ethnicities, locations previously lived, educational histories or other information), or any other personal data (such as incomes, assets, or other financial metrics) or other data that such entities may wish to maintain in a private manner.

Figure 1F:
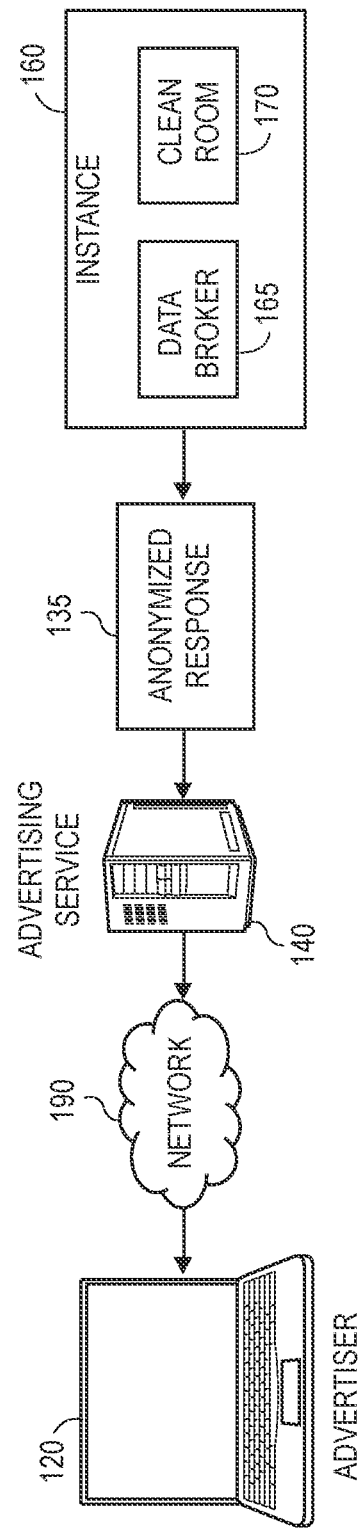

As is shown in FIG. 1F, an anonymized response 135 is returned by the instance 160, e.g., from the clean room 170 by way of the data broker 165, to the advertiser 120 over the one or more networks 190.

In accordance with implementations of the present disclosure, results of queries may be anonymized, or otherwise altered or modified to anonymize the results, or to ensure that the results obscure data regarding individual customers among a group of such customers, to enable that the data may be used for one or more purposes while also ensuring that such customers may not be reidentified by linking the data regarding such customers to other sets of data. Results of queries may be deemed "k-anonymous," if identifiers or quasi-identifiers for each customer in a set of data are identical to at least k−1 other customers in the set of data.

In some implementations, the clean room 170 or queries executed thereby may enforce k-anonymity by analyzing input row contributions of each result set output row and ensuring that a number of unique customers contributing to that row meet or exceed a minimum aggregation threshold. In some implementations, the minimum aggregation threshold may be enforced by rewriting or modifying a query to accumulate row contributions in a common table expression sub-query. For example, k-anonymity may be enforced based on predefined sensitivity levels of individual sets, e.g., by constructing graphs connecting workflow outputs to all inputs that may directly or indirectly influence values of the outputs, with each node in the graphs representing types of transformations as well as rules that are used to compute resulting sensitivity levels. Aggregate operations and other columns for counting distinct identities of customers may be added to such graphs. Moreover, results may be redacted if an actual count of distinct identities of customers is lower than a predetermined threshold set based on a specified sensitivity level.

Alternatively, in some implementations, the anonymized response 135 may be generated by suppression, e.g., by replacing one or more specific values of the results 130 with a general value or identifier. In some other implementations, the anonymized response 135 may be generated by generalization, e.g., by replacing one or more specific values of the results 130 with a broader range or category within which the specific values are included.

Figure 1G:
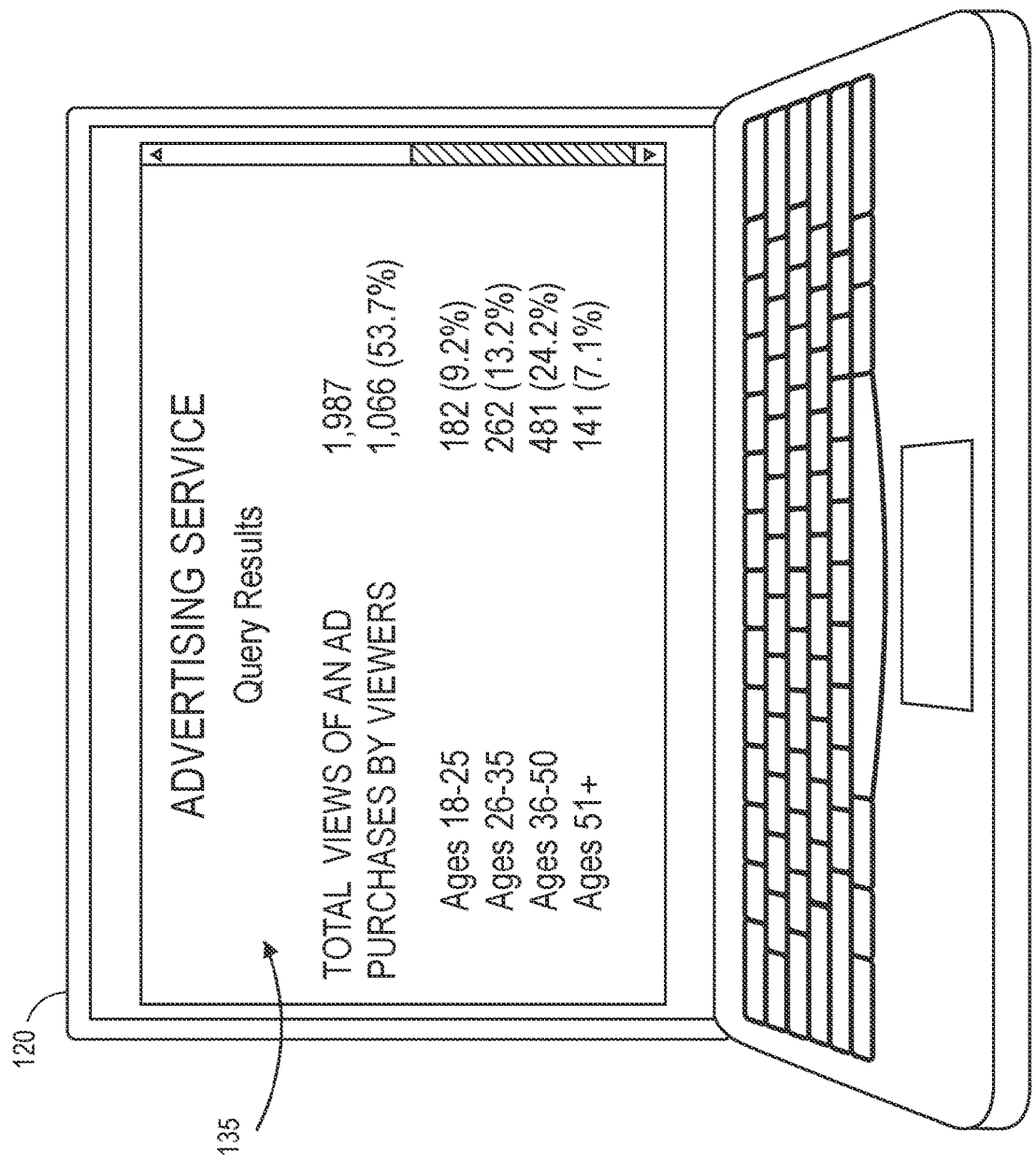

As is shown in FIG. 1G, the anonymized response 135 to the query is displayed to the advertiser 120, and identifies purchase by viewers of advertisements with respect to total numbers of views of the advertisements. As is further shown in FIG. 1G, the anonymized response 135 further breaks down purchases by such viewers by their respective age groups, e.g., customers between the ages of eighteen and twenty-five, customers between the ages of twenty-six and thirty-five, customers between the ages of thirty-six and fifty, and customers aged fifty-one and over.

Figure 2A:
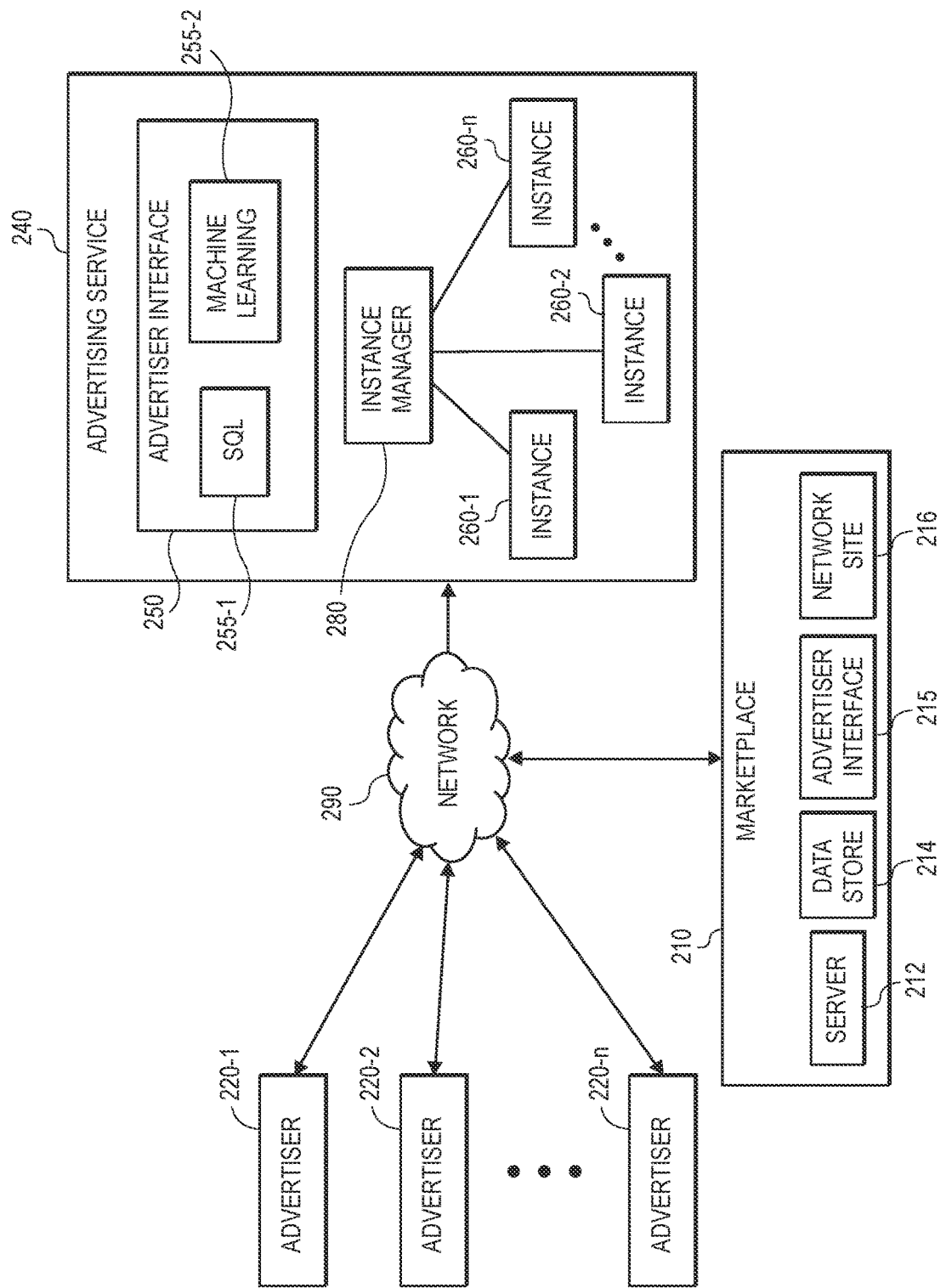
FIGS. 2A and 2B are block diagrams of one system for advertising analysis in accordance with embodiments of the present disclosure.
Figure 2B:
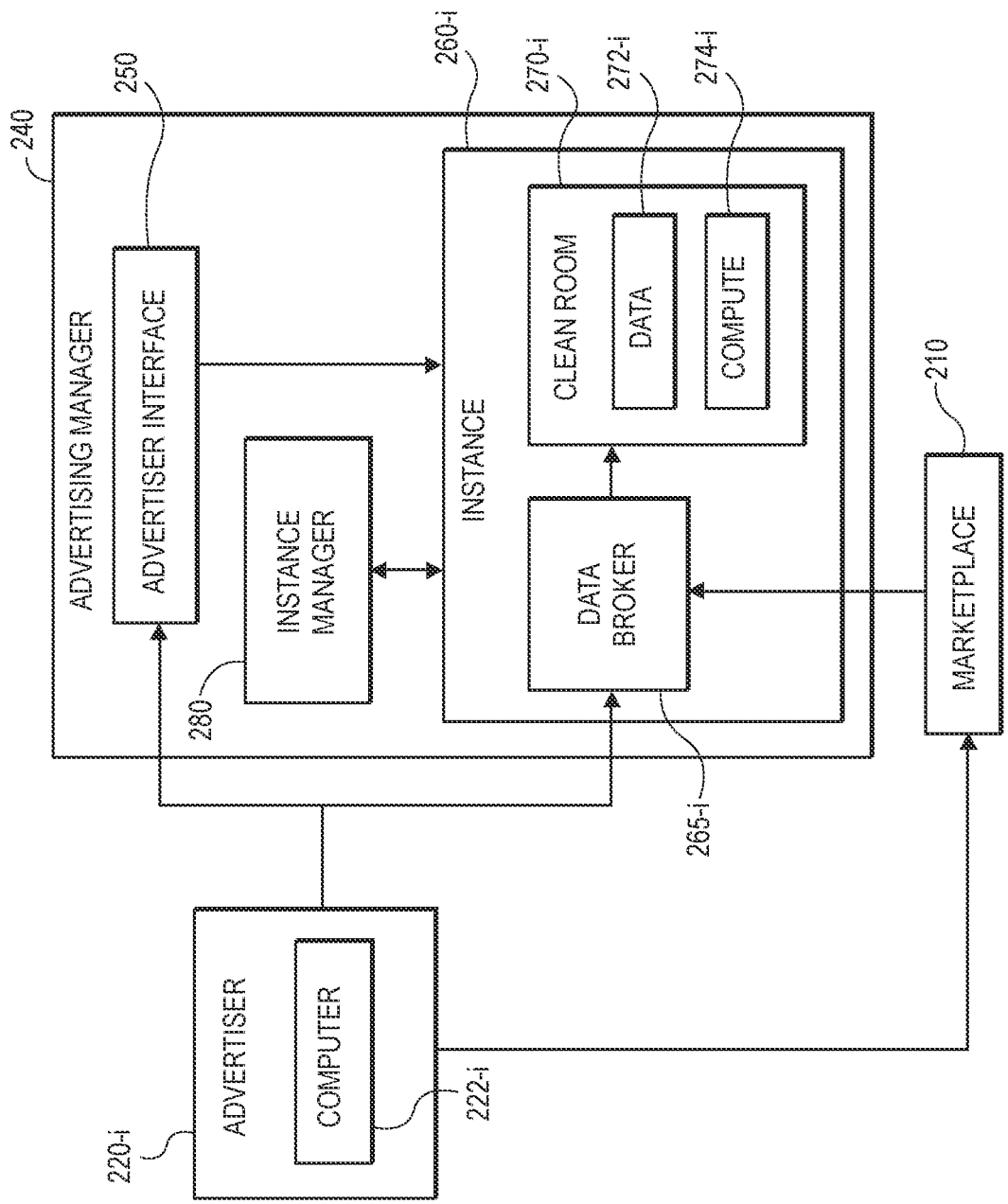

Referring to FIGS. 2A and 2B, block diagrams of one system 200 for advertising analysis in accordance with embodiments of the present disclosure are shown. Except where otherwise noted, reference numerals preceded by the number "2" shown in FIGS. 2A and 2B indicate components or features that are similar to components or features having reference numerals preceded by the number "1" shown in FIGS. 1A through 1G.

As is shown in FIG. 2A, the system 200 includes a marketplace 210, a plurality of advertisers 220-1, 220-2 . . . 220-n, and an advertising service 240 that operate or maintain computer devices or systems that may connect to one another over one or more networks 290, which may include the Internet in whole or in part.

The marketplace 210 may be any entity or individual that wishes to make items from a variety of sources available for download, purchase, rent, lease or borrowing by customers using a networked computer infrastructure, including one or more physical computer servers 212 and data stores (e.g., databases) 214 for hosting a network site 216 (e.g., a web site), and an advertiser interface 215. The marketplace 210 may be physically or virtually associated with one or more storage or distribution facilities, fulfillment centers, retail establishments or other systems. The network site 216 may be implemented using the one or more servers 212, which connect or otherwise communicate with the one or more data stores 214 as well as the network 290, through the sending and receiving of digital data. The servers 212 may cause the display of information associated with the network site 216 in any manner, e.g., by transmitting code such as Hypertext Markup Language (or "HTML") code over the network 290 to another computing device that may be configured to generate and render the information into one or more pages and to display such pages on a computer display of any kind. Moreover, the data stores 214 may include any type of information regarding items that have been made available for sale through the marketplace 210, or ordered by customers from the marketplace 210.

The advertiser interface 215 enables each of the advertisers 220-1, 220-2 . . . 220-n to communicate with the marketplace 210 directly, e.g., through the sending and receiving of digital data. For example, any of the advertisers 220-1, 220-2 . . . 220-n may provide information or data to the marketplace 210 regarding any number of goods or services, such as product specifications, or receive any information or data from the marketplace 210 regarding such goods or services, such as sales data. Alternatively, or additionally, any other information or data may be transferred between any of the advertisers 220-1, 220-2 . . . 220-n and the marketplace 210 in accordance with implementations of the present disclosure.

The advertisers 220-1, 220-2 . . . 220-n may be any entities that present advertisements to one or more goods or services to potential customers in any manner, such as on network pages of entities, such as the marketplace 210, over one or more networks 290. For example, in some implementations, one or more of the advertisers 220-1, 220-2 . . . 220-n may be a direct advertiser, such as an entity having one or more brands, lines or other sets of goods or services available to customers either by way of the marketplace 210 or from any other source, and which causes dynamic or static advertisements to be presented to customers in any manner. Alternatively, one or more of the advertisers 220-1, 220-2 . . . 220-n may be an advertising agent or agency, which may contract with or otherwise be instructed by one or more entities having brands, lines or other sets of goods or services available to customers, for the presentation of dynamic or static advertisements to customers.

The advertisers 220-1, 220-2 . . . 220-n may cause advertisements to be presented to customers, or to prospective or potential customers, in any manner and according to any strategy or schedule. For example, the advertisers 220-1, 220-2 . . . 220-n may present dynamic advertisements, or advertisements having variable positions or presences, either virtually or physically. The dynamic advertisements may include, but are not limited to, banner advertisements that are posted on pages of network sites, print or electronic advertisements appearing on objects in motion, electronic billboards having rotating or variable displays, radio or television commercials that are aired randomly or for different intervals, or others.

The advertisers 220-1, 220-2 . . . 220-n may also present static advertisements, or advertisements that are fixed in their positions or presence, either virtually or physically, for more than an insignificant period of time. The static advertisements may include one or more billboards or other signs that are mounted or installed atop buildings or poles and include one or more substantially flat surfaces that are adorned with one or more physical or electronic advertisements and aligned in a specific direction, as well as placards, signs, posters, print advertisements, any persistently run audio or video advertisements (e.g., radio or television commercials, such as infomercials), or others.

The advertisers 220-1, 220-2 . . . 220-n may operate one or more computer devices that may be connected to the network 290, in order to transmit or receive information or data regarding one or more items that the advertisers 220-1, 220-2 . . . 220-n offers for downloading, purchasing, renting, leasing or borrowing by consumers, or for any other purpose. In some embodiments, the advertisers 220-1, 220-2 . . . 220-n may operate exclusively out of physical establishments (e.g., a bricks-and-mortar retail environment such as a department store, a grocery store, a book store, a convenience store, a hardware store or the like). In some embodiments, the advertisers 220-1, 220-2 . . . 220-n may operate exclusively in virtual environments, and may make one or more items available to consumers via one or more network sites either independently or in conjunction with one or more third parties, including but not limited to the marketplace 210. In some other embodiments, the advertisers 220-1, 220-2 . . . 220-n may operate out of physical establishments and also virtually, e.g., through one or more network sites.

The advertising service 240 may be any servers or other computer systems configured to receive, generate or transmit information or data regarding advertisements for one or more goods or services as well as sales of such goods or services, or any other information or data regarding the advertisements or the goods or services. The servers or computer systems of the advertising service 240 may further include any number of processors, memory components, data stores, transceivers, or any other components for receiving, storing, processing or transmitting data. Alternatively, or additionally, the advertising service 240 may be a set of applications or programs operating on one or more of such servers or computer systems.

As is shown in FIGS. 2A and 2B, the advertising service 240 maintains or operates an advertiser interface 250, including an SQL engine 255-1 or a machine learning engine 255-2. The SQL engine 255-1 is configured to receive any number of queries from any of the advertisers 220-1, 220-2 . . . 220-n, e.g., directly via one or more user interfaces, network pages or other portals, or in any other manner. Such queries, or a class of queries, may be requested to be run on any number of sets of data associated with a given advertiser. The SQL engine 255-1 may receive requests to run queries having any level of specificity, including instructions to run queries on any number of features, columns or other aspects of a set of data that are to be considered in answering a query. In some implementations, the SQL engine 255-1 may be programmed with or have access to any number of templates of queries, e.g., instructional queries, which may be selected by any of the advertisers 220-1, 220-2 . . . 220-n. For example, the templates may include queries that lack at least one term. One of the advertisers 220-1, 220-2 . . . 220-n may provide the query by selecting one of the templates and also providing at least one term to be utilized in connection with the query.

The machine learning engine 255-2 may receive instructions to receive any number of inputs associated with sets of data of a given advertiser, and to generate outputs based on such inputs. The machine learning engine 255-2 may operate or execute any number of machine learning models, algorithms or techniques, such as one or more artificial neural networks, each having an input layer, any number of hidden layers (e.g., intervening layers) and an output layer. The machine learning engine 255-2 may operate or execute a transformer having one or more attention mechanisms, e.g., a bidirectional encoder representations from transformer (or "BERT"); a deep learning system; a nearest neighbor method or analysis; a factorization method or analysis; a generative model; a gradient boosted decision tree; a K-means clustering analysis; a Random Forest algorithm; a support vector machine; a similarity measure, or others.

The advertising service 240 further includes a plurality of instances 260-1, 260-2 . . . 260-n, each of which is associated with one of the advertisers 220-1, 220-2 . . . 220-n and is in communication with an instance manager 280. The instances 260-1, 260-2 . . . 260-n may each have similar or common structures, but may contain data that is unique or restricted to the one of the advertisers 220-1, 220-2 . . . 220-n. The instance manager 280 contains instance data that allows for the management of the instances 260-1, 260-2 . . . 260-n, along with information, data or metadata regarding statuses of software operating on each of such instances. The instance manager 280 may also be responsible for establishing the instances 260-1, 260-2 . . . 260-n for the advertisers 220-1, 220-2 . . . 220-n, or new instances for other advertisers, and installing the basic infrastructure and software to make instances operational. The instance manager 280 also initiates loading of data into each of the instances 260-1, 260-2 . . . 260-n.

As is shown in FIG. 2B, a representative instance 260-i of the instances 260-1, 260-2 . . . 260-n is associated with a representative advertiser 220-i of the advertisers 220-1, 220-2 . . . 220-n. The instance 260-i includes a data broker 265-i and a clean room 270-i. The data broker 265-i is configured to facilitate transfer of data originating from external sources, e.g., the marketplace 210 or the advertiser 220-i into the clean room 270-i, e.g., by the advertiser 220-i or any other participants in the clean room 270-i, or from any external sources, e.g., the marketplace 210. The data broker 265-i further maintains an identity graph that may map identifiers of customers, e.g., customers of the marketplace 210 or any other source, with identifiers of advertisements. The advertiser interface 250 enables any advertiser, viz., the advertiser 220-i, to interact with the instance 260-i, or provide one or more sets of instructions regarding operations of the instance 260-i subject to any rules, considerations or constraints.

The clean room 270-i includes a data store 272-i, e.g., a secure persistent store, and a compute component 274-i, e.g., a secure execution environment. The clean room 270-i may have any number of participants. In some implementations, a first participant to join the clean room 270-i is the advertiser 220-i, and any other participants who join the clean room 270-i must be approved by the advertiser 220-i. Moreover, the clean room 270-i may be established when a first of such participants joins the clean room 270-i, and disestablished when a last of such participants departs the clean room 270-i.

The data store 272-i may include sets of data, e.g., source input sets of data, offered into the data store by the advertiser 220-i or by any other participants in the clean room 270-i that own or control such sets of data. In some implementations, input sets of data offered into the data store 272-i by any participant may not be consumed by the advertiser 220-i or by such participants.

The compute component 274-i may execute any operations on data offered into the clean room 270-i by participants. The compute component 274-i may, therefore, consume data within the data store 272-i to produce results in the form of derived input data sets, or output data sets. Moreover, in some implementations, the compute component 274-i may not export data to any data stores other than the data store 270-i of the instance 260-i. Furthermore, in some implementations, output data sets generated by the compute component 274-i may be validated according to one or more sets of rules prior to being consumed by the compute component 274-i or by any other participants in the clean room 270-i.

The advertiser 220-i or any other participant in the clean room 270-i may grant rights for other participants in the clean room 270-i to consume output data sets comprised of data derived from an input data set of the advertiser 220-i or the other participant. For example, where the advertiser 220-i or any other participant offers a source input data set to the clean room 270-i, the advertiser 220-i or the other participant is granted rights to any output data set generated from the source input data set. In some other implementations, any participant that is granted access to a data set is also granted access to an output data set generated from that data set. An output data set generated from multiple input data sets, however, may only be consumed by participants having rights to consume output data sets generated from each of the input data sets individually.

Furthermore, in some implementations, the advertiser 220-i or another participant in the clean room 270-i may revoke rights of participants to consume output data generated based only on input data owned by the advertiser 220-i or the other participant. Likewise, in some implementations, when the advertiser 220-i or the other participant departs the clean room 270-i, all rights to access input data sets owned by the advertiser 220-i or the other participant, or output data sets generated from the input data sets, are revoked.

The compute component 274-i enables the advertiser 220-i to generate any number of sets of instructions for reading or processing one or more records or sets of data maintained in the data store 272-i, or to write one or more records or sets of data to the data store 272-i. The advertiser 220-i or any other participant in the clean room 270-i may be permitted to generate such sets of instructions only if the advertiser 220-i or the participant in the clean room 270-i is authorized to consume output data sets generated based on input data sets within the data store 272-i. The compute component 274-i further enables the advertiser 220-i or any other participant in the clean room 270-i to specify portions of the data store 272-i as constituting dimensions, metrics, keys or other features, as well as levels of sensitivity of metrics, and to ensure that metrics used in output data sets conform to aggregate statements.

Additionally, the compute component 274-i may receive instructions from the advertiser 220-i or other participants in the clean room 270-i to enable such participants to create the clean room 270-i, to delete the clean room 270-i, to invite other participants to the clean room 270-i, or to depart the clean room 270-i.

The compute component 274-$i$ may also execute any number of trusted functions over sets of data maintained in the data store 272-$i$. For example, in some implementations, the compute component 274-$i$ may execute sets of operations over any input data sets that result in one or more output data sets having contents that preserve the privacy of customers or other individuals, such as by enacting or executing one or more provisions to prevent the reidentification of any customers or other individuals from the output data sets. For example, in some implementations, a query executed by the compute component 274-$i$ on data in the data store 272-$i$ must ensure k-anonymity, where k is not less than a substantially large number, such as one hundred, and i-diversity, such as where l is not less than a smaller number, such as ten, of output data produced thereby. In some implementations, the compute component 274-$i$ inhibits reidentification of customers from differential privacy attacks by static analyses of a feature vector of a query and applications of variations over the feature vector applied to any single data set.

Data maintained in the respective data stores 272-$i$ of the respective clean rooms 270-$i$ of customers may be keyed, and may use a unique key space that is not shared with any other clean rooms of any other advertisers.

The types or forms of data that may be processed in accordance with implementations of the present disclosure to generate queries are not limited by any of the embodiments disclosed or referenced herein. For example, the data may include any type or form of sensitive data, private data, or any other data that is to be restricted or maintained in confidence for any reason. In some implementations, such as where one or more of the systems or methods disclosed herein are operated or utilized by an electronic marketplace or another commercial enterprise in communication with one or more computer devices or systems owned or operated by customers, the data may include identities of the customers, as well as street addresses, identifiers of payment instruments (e.g., credit cards or bank cards), or purchase histories of the customers. In some implementations, the data may include identifiers of insurance policies, or identifiers of medical conditions or histories (e.g., treatment plans, procedures or prescriptions) of one or more of the customers. In some implementations, the data may include personal information of customers (e.g., tax identification numbers such as Social Security Numbers). Alternatively, the data may have been obtained from any source, and is customarily or necessarily preserved in confidence according to one or more laws, regulations or public or private policies.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The marketplace 210, the advertisers 220-1, 220-2 . . . 220-$n$, and the advertising service 240 or any other computer devices or systems of the system 200 (not shown) may use any web-enabled or Internet applications or features, or any other client-server applications or features, to connect to the network 290, or to communicate with one another. For example, the marketplace 210, the advertisers 220-1, 220-2 . . . 220-$n$, and the advertising service 240 may be adapted to transmit information or data in the form of synchronous or asynchronous messages in real time or in near-real time, or in one or more offline processes, via the network 290. Those of ordinary skill in the pertinent art would recognize that the marketplace 210, the advertisers 220-1, 220-2 . . . 220-$n$, and the advertising service 240 may operate, include or be associated with any of a number of computing devices that are capable of communicating over the network 290. The protocols and components for providing communication between such devices are well known to those skilled in the art of computer communications and need not be described in more detail herein.

In some implementations, the marketplace 210, the advertisers 220-1, 220-2 . . . 220-$n$, and the advertising service 240 may execute any type or form of algorithm for auto-differentiation or optimization, e.g., an auto-differentiation framework, such as JAX, Python, PyTorch, MXNet, TensorFlow, or others. Moreover, one or more of the algorithms, formulas or techniques described herein may be executed on any type or form of computing device or system.

The data and/or computer executable instructions, programs, firmware, software and the like (also referred to herein as "computer executable" components) described herein may be stored on a computer-readable medium that is within or accessible by computers or computer components of the marketplace 210, the advertisers 220-1, 220-2 . . . 220-$n$, and the advertising service 240, or any other computer devices or systems of the system 200 (not shown), and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Unless otherwise expressly stated, the term "clean room" herein may have the same definition or meaning as the term "data clean room." As used herein, the term "clean room" shall not have a definition or meaning consistent with that of an enclosed space that is maintained free of contamination or particulate matter, or with contamination or particulate matter below acceptable levels, and is typically used for the manufacture, maintenance or evaluation of small products, electrical components, or other items.

Figure 3:
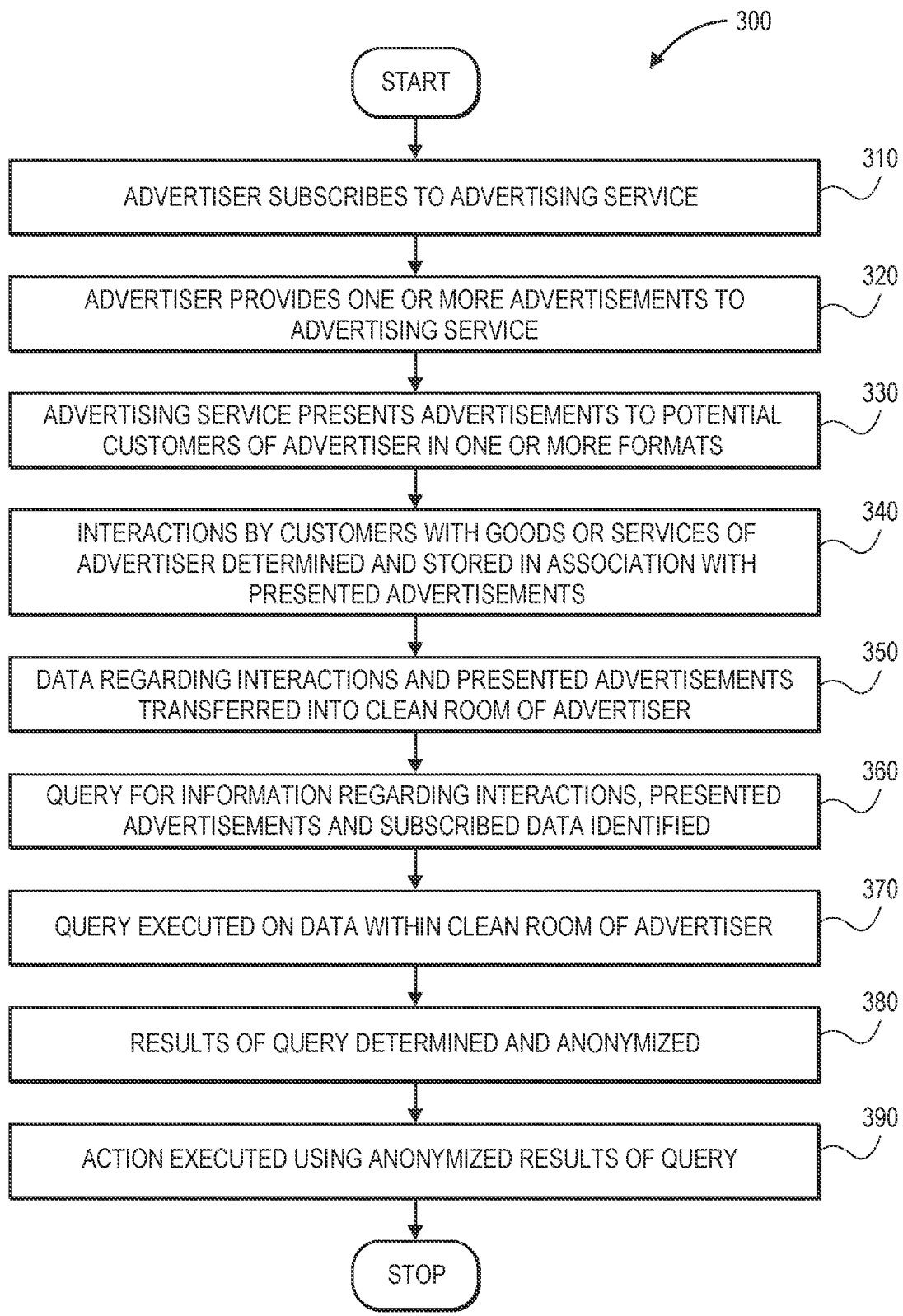
FIG. 3 is a flow chart of one process for advertising analysis in accordance with embodiments of the present disclosure.

Referring to FIG. 3, a flow chart 300 of one process for advertising analysis in accordance with embodiments of the present disclosure is shown.

At box 310, an advertiser subscribes to an advertising service (or an analysis service). In some implementations, the advertising service may be hosted by one or more servers or other computer devices or systems affiliated with a marketplace, a media source, or any other entity that may present advertisements to viewers or prospective customers, e.g., via one or more network pages, in one or more dedicated applications, as one or more video advertisements or commercials, or in any other manner.

In some implementations, the advertiser may be a direct advertiser, e.g., an owner of a brand or a manufacturer, a merchant, a seller or a vendor of one or more goods or services. In some other implementations, the advertiser may be an advertising agent or agency that presents advertisements to viewers or prospective customers on behalf of multiple brands, or multiple manufacturers, merchants, sellers or vendors.

At box 320, the advertiser provides one or more advertisements for goods or services to the advertising service. For example, the advertisements may include one or more still or moving images, as well as any associated audio files, sets of text or any other information, data or metadata, and may relate to one or more goods or services associated with the advertiser. Alternatively, the advertisements may have been generated or provided to the advertising service by one or more third parties, e.g., producers of images, audio or video files or other multimedia.

At box 330, one or more of the advertisements are presented to potential customers in one or more formats. For example, such advertisements may be presented to potential customers as banners, windows or other visual features on network pages (e.g., web pages), on screens or windows of one or more general-purpose or dedicated applications, or on monitors, televisions or other displays.

At box 340, interactions by customers involving the goods or services are determined and stored in association with the presented advertisements. For example, the interactions may include conversion events for at least one good or service attributed to one of the advertisements, additions of at least one good or service to a shopping cart or a registry, impressions of one of the plurality of advertisements, selections of information regarding at least one good or service by the at least one of the viewers, views of information regarding at least one of good or service by the at least one of the viewers, or any other interactions. Each of the interactions by customers may be referenced by a date and a time, an identifier of the customer, an identifier of an advertisement with which the interaction may be associated, as well as a format of advertisement, a platform or a device on which the advertisement was viewed or a platform or a device from which the interaction by the customer occurred.

At box 350, data regarding the interactions and the presented advertisements is transferred into a clean room of the advertiser. For example, an instance established for the advertiser may include a data broker and a clean room, and the advertiser may offer an input data set of data into a data store of the clean room, which may be a unique key space associated with the advertiser and no other advertisers or entities. The input data set associated with the advertiser may be a subset of data regarding multiple advertisers that subscribed to the advertising service, which may be maintained in a secure storage facility or in any other location or on any other system. In some implementations, an input data set of the data regarding the interactions and the presented advertisements may be keyed to an identifier of the advertiser.

In some implementations, where the advertising service is associated with a marketplace, each of the interactions represented in the data transferred into the clean room of the advertiser at box 350 may relate to interactions at the marketplace exclusively and not at any other source of goods or services of the advertiser. Alternatively, in some implementations, where goods or services of the advertiser are available via forums or sources unrelated to the advertising service, e.g., one or more forums or sources other than a marketplace associated with the advertising service, the advertiser may provide data regarding interactions with its goods and services via such other forums or sources, and advertisements for such goods or services, to the clean room in addition to data regarding interactions and presented advertisements that is otherwise available to the advertisement service.

In some implementations, the data regarding the interactions and the presented advertisements of the advertiser may remain in a data store on which the data is stored, but may be logically partitioned by a software construct to include only the data associated with the advertiser. The logically partitioned data may be made available for a query to be executed, e.g., by a compute component associated with the clean room, or by another execution environment.

At box 360, a query for information regarding the interactions by the customers involving the goods and services and the presented advertisements as well as subscribed data is identified. For example, in some implementations, the query may include one or more terms that are received from the advertiser, e.g., via one or more user interfaces of a network page, an application or any other systems. In some other implementations, the advertiser may select the query from a set of templates, and may manually enter one or more terms or other information to be included in the query via one or more user interfaces. In some other implementations, the query may be automatically generated, e.g., by the advertising service or by any other computer devices or systems. In some other implementations, the query may be selected according to one or more machine learning techniques.

In some implementations, the subscribed data may include, but need not be limited to, categories for each of a plurality of conversion events; dates and times of each of the conversion events; dates and times of each of the impressions; dates and times of each of the interactions; dates and times of each of the selections; dates and times of each of the views; descriptions of each of the conversion events; identifiers of at least one of a good or a service associated with each of the conversion events; numbers of purchases of items resulting from each of the conversion events; prices of the at least one of the good or the service associated with each of the conversion events, or any other data associated with a subscription to the advertising service.

At box 370, the query is executed on the data within the clean room of the advertiser. In some implementations, the execution of the query may result in the generation of an output data set from an input data set including the data regarding the interactions and the presented advertisements of the advertiser. In some implementations, the output data set may be validated according to one or more sets of rules.

At box 380, results of the query are determined and anonymized. In some implementations, the results of the query may be anonymized by aggregation. For example, where the query takes the form of an SQL expression, the query may be compiled into an abstract syntax tree, which may be traversed or reasoned about to examine the constructs used, to ensure that each column reference to a constrained table occurs in a correct context, to project a dependency chain of column references from the initial reference to their final contribution to their output columns, and to rewrite the SQL expression to inject aggregation information and to validate that aggregation thresholds have been met. The SQL expression may be used to determine whether an output row has enough distinct values, or whether the output row should be disregarded.

Moreover, results of a query may be anonymized and aggregated to generate cohorts, e.g., groups of input data in ranges, and the anonymized data may identify the results of the query with respect to such cohorts. For example, where the results of the query identify persons by their street addresses or their ages, the anonymized results may refer to locations of the persons by Zoning Improvement Plan (or "ZIP") codes, cities or towns, area codes or states, or other broader identifiers, or to ages of the persons by bands or numbers of years, rather than a specific ages in years and months.

Alternatively, in some implementations, the results may be anonymized by suppression (e.g., by replacing one or more specific values with a general value or label), by generalization (e.g., by replacing one or more specific values with ranges or bands in which the specific values are included), or in any other manner.

At box 390, one or more actions are executed using the anonymized results of the query, and the process ends. For example, where the query requests to identify customers that purchased a good or service from the advertiser after viewing one of the presented advertisements, the advertiser may identify one or more prospective customers for another good or service based on the anonymized results of the query, present one or more additional advertisements for the other good or service to such prospective customers. Alternatively, where the query requests to identify prospective customers who viewed an advertisement for a good or a service but did not purchase the good or service, the advertiser may identify another advertisement for the same good or service, or an advertisement for a different good or service, and may present such advertisements to such prospective customers. The advertiser may take any other action with respect to the anonymized results of the query in accordance with implementations of the present disclosure.

Figure 4:
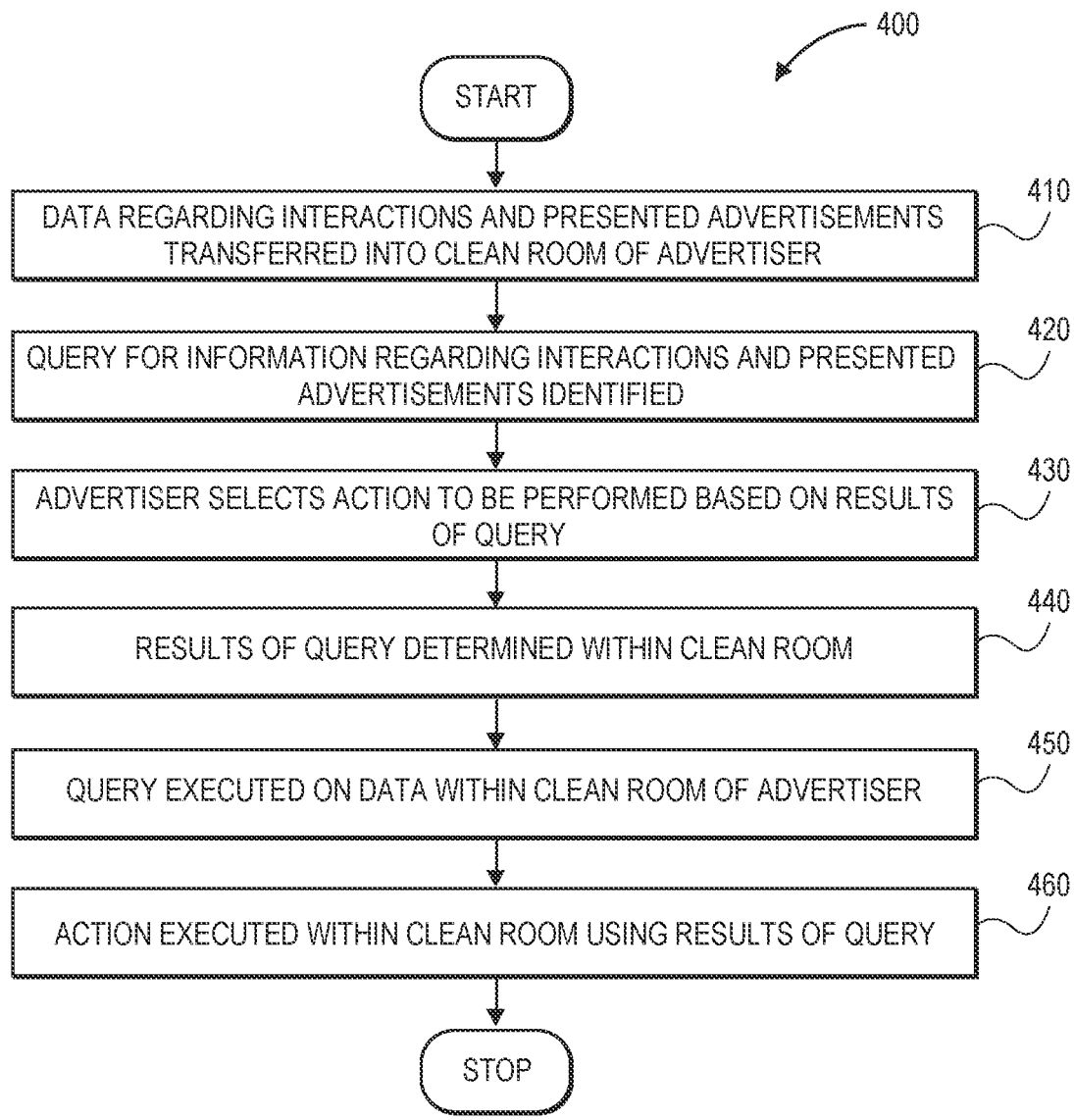
FIG. 4 is a flow chart of one process for advertising analysis in accordance with embodiments of the present disclosure.

In some implementations of the present disclosure, a clean room may aid in the preservation of privacy of customer data by enabling queries to be conducted on the customer data while the data is within the clean room, without transferring the data to any other data stores or facilities. Actions requested by an advertiser may be executed on results of a query within a clean room. Referring to FIG. 4, a flow chart 400 of one process for advertising analysis in accordance with embodiments of the present disclosure is shown.

At box 410, data regarding interactions and a plurality of advertisements of an advertiser that are presented to customers is transferred into a clean room associated with the advertiser. In some implementations, the advertiser may offer the input data from a secure data store or any other location into a data store of the clean room, e.g., by way of a data broker or in any other manner. The data associated with the interactions and the presented advertisements of the advertiser may be identified based on one or more keys of the advertiser, or in any other manner. Such keys may enable data of the advertiser to be identified and offered into the clean room, e.g., as an initial data set, or a source initial data set, without any other data of any other advertisers.

The advertisements may have been presented to customers in any manner and in any format, e.g., visual images, a video, a pop-up window, or in any other manner. The interactions may include, but need not be limited to, conversion events for at least one good or service, additions of at least one good or service to a shopping cart or a registry, impressions of one of the plurality of advertisements, selections of information regarding the at least one good or service, views of information regarding at least one of good or service, or any other interactions. Such interactions may be referenced by a date and a time, an identifier of the customer, an identifier of an advertisement with which the interaction may be associated, as well as a format of advertisement, a platform or a device on which the advertisement was viewed or a platform or a device from which the interaction by the customer occurred.

At box 420, a query for at least some of the information regarding interactions and advertisements of an advertiser that are presented to customers is identified. The advertiser may provide the query via one or more user interfaces or other systems, select the query from a template, identify the query according to one or more machine learning techniques, or otherwise select the query in any other manner.

At box 430, the advertiser selects an action to be performed based on results obtained from the query. For example, the action may involve the presentation of additional advertisements to customers identified from the results, e.g., advertisements for the same goods or services, or different goods or services.

At box 440, the query is executed on the data within the clean room of the advertiser. For example, the clean room may include one or more compute functions or components that execute the query, e.g., a "select" clause and/or a "from" clause, on the contents of a data store of the clean room, and identify one or more sets of data responsive to the query.

At box 450, results of the query are determined within the clean room. Such results may take any form, e.g., a table including rows of data responsive to a query.

At box 460, the selected action is executed within the clean room based on the results of the query, and the process ends. For example, a compute component of the clean room may execute the action selected by the advertiser at box 430 within the clean room on the data without ever sharing the data with the advertiser, or otherwise risking a loss of privacy of customers identified in results to the query. Alternatively, in some implementations, the selected action may be executed on results that are anonymized in any manner in accordance with implementations of the present disclosure.

Thus, the advertiser may request that an advertising service perform one or more actions on data securely maintained in one or more data stores. The data of the advertiser may be offered into a clean room and subjected to one or more queries. Actions requested by the advertiser may be performed based on results of such queries, which may include information or data that may be considered private, without every divulging the results of such queries to the advertiser. For example, where the advertiser requests that an advertisement for a first product be displayed to all customers who purchased a second product, the advertising service may identify the customers on behalf of the advertiser and present the advertisement for the first product to such customers without ever divulging identities of such customers or any other private information or data regarding the customers to the advertiser.

Figure 5:
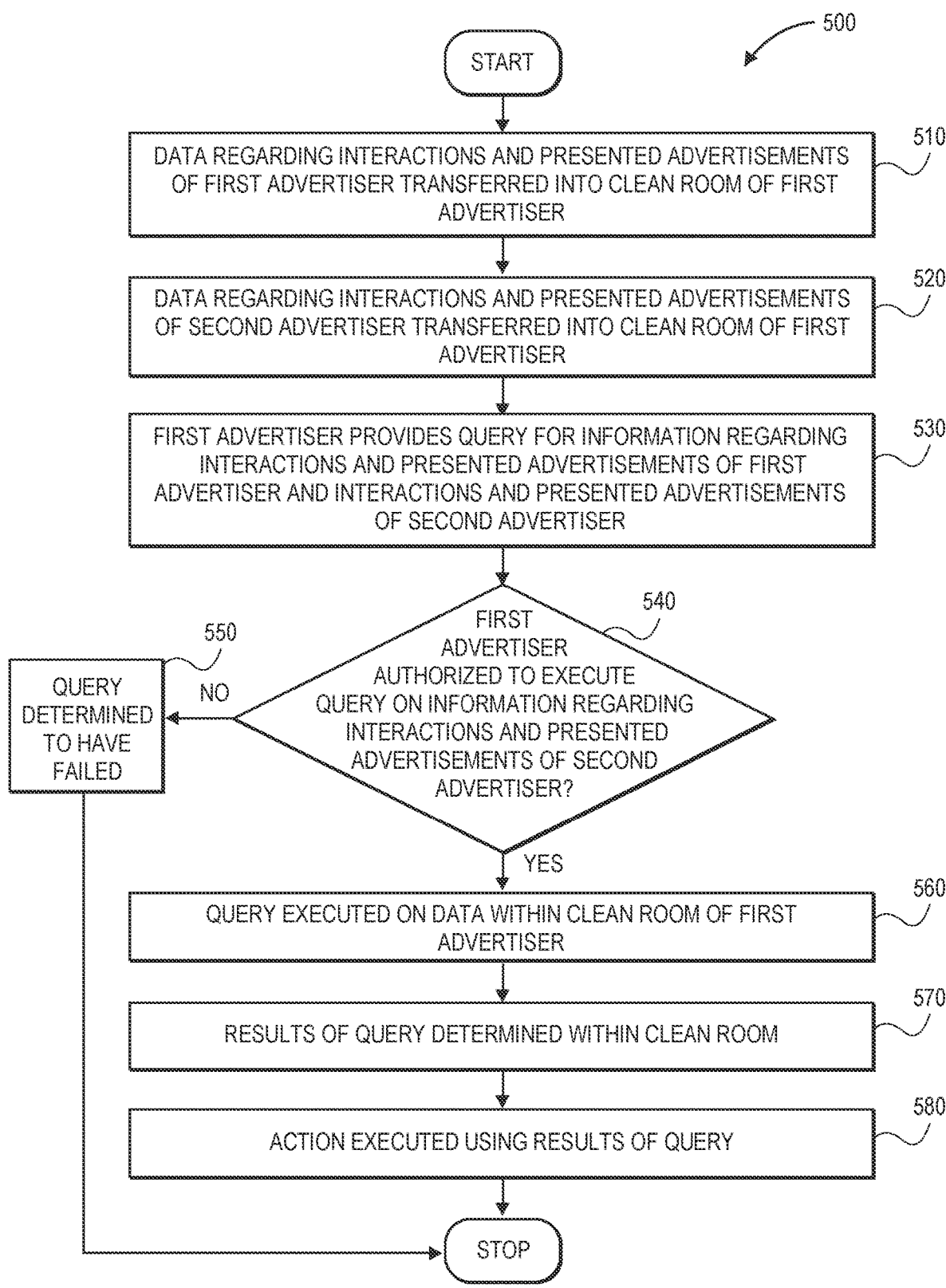
FIG. 5 is a flow chart of one process for advertising analysis in accordance with embodiments of the present disclosure.

A clean room may include not only data regarding interactions with advertisements of an advertiser associated with the clean room but also data regarding interactions with advertisements of other advertisers, where the advertiser is authorized to run queries on that data. Referring to FIG. 5, a flow chart 500 of one process for advertising analysis in accordance with embodiments of the present disclosure is shown.

At box 510, data regarding interactions and presented advertisements of a first advertiser is transferred into a clean room of the first advertiser. For example, the first advertiser may offer data owned by the first advertiser into a data store of a clean room of the first advertiser, e.g., as a source input data set. Alternatively, the first advertiser may request to be a participant in another clean room, and offer data owned by the first advertiser into a data store of that clean room.

At box 520, data regarding the interactions and the presented advertisements of a second advertiser is transferred into the clean room of the first advertiser. For example, the second advertiser may offer data regarding interactions (e.g., conversion events, impressions, selections, views or any other events) into a data store of the same clean room where data regarding interactions of the first advertiser is located. The first advertiser may invite the second advertiser to be a participant in the clean room of the first advertiser, such as by one or more electronic messages or in any other manner. Alternatively, each of the first advertiser and the second advertiser may be invited to be participants in a clean room in an instance of an advertiser other than the first advertiser or the second advertiser.

At box 530, a first advertiser provides a query for information regarding interactions and presented advertisement of the first advertiser and information regarding interactions and presented advertisement of the second advertiser. For example, the first advertiser may generate a query that would be run on data owned by not only the first advertiser but also the second advertiser, such as queries for conversion events for goods or services of either the first advertiser or the second advertiser, impressions of advertisements of the first advertiser or the second advertiser, selections or views of information regarding goods or services of the first advertiser or the second advertiser, or any other interactions.

At box 540, whether the first advertiser is authorized to execute the query on information regarding the interactions and the presented advertisements of the second advertiser is determined. For example, whether the second advertiser has accepted an invitation to become a participant in a clean room of the first advertiser, or any other clean room, may be determined.

If the first advertiser is not authorized to execute the query on information regarding the interactions and the presented advertisements of the second advertiser is determined, then the process advances to box 550, where the query fails, and the process ends.

If the first advertiser is authorized to execute the query on information regarding interactions and presented advertisements of the second advertiser, then the process advances to box 560, where the query is executed on the data within the clean room.

At box 570, results of the query are determined within the clean room. For example, the results of the query may be maintained within a data store of the clean room, and not shared with either the first advertiser or the second advertiser, thereby ensuring that private data of customers of the first advertiser or the second advertiser is not divulged to either the first advertiser or the second advertiser. Alternatively, the results of the query may be anonymized in any manner, e.g., by aggregation, and the process ends.

At box 580, one or more actions are executed using the results of the query determined at box 570, and the process ends.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow charts of FIG. 3, 4 or 5, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 100 of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. An advertising system comprising:
a computer server having at least one data store,
wherein the computer server is programmed with one or more sets of instructions that, when executed, cause the computer server to perform a method comprising:
receiving a subscription to an advertising service from a first advertiser;
designating a first instance having a first data broker and a first clean room as associated with the first advertiser, wherein the first instance is one of a plurality of instances, wherein each of the plurality of instances comprises a data broker and a clean room, wherein each of the plurality of instances is associated with an advertiser subscribed to the advertising service, wherein each of the clean rooms of each of the plurality of instances comprises a container for data associated with an advertiser subscribed to the advertising service and computer infrastructure for executing one or more processes on data within the container, and wherein the first clean room is one of the clean rooms comprising a first container for data associated with the first advertiser;
presenting, by the advertising system, a plurality of advertisements of the first advertiser to viewers in a plurality of formats, wherein at least one of the plurality of formats is one of:
a display of one of the plurality of advertisements in a network page of an electronic marketplace;
a display of one of the plurality of advertisements in a network page of an entity other than the electronic marketplace; or
a display of one of the plurality of advertisements in a video program;
identifying data regarding a plurality of interactions with at least one of the plurality of advertisements of the first advertiser, wherein the data identifies at least:
conversion events for the at least one of a good or a service attributed to one of the plurality of advertisements;
impressions of one of the plurality of advertisements by the at least one of the viewers;
selections of information regarding the at least one of the good or the service by the at least one of the viewers; and
views of information regarding the at least one of the good or the service by the at least one of the viewers;
identifying a query associated with at least one of the first advertiser or the first advertisement;
transferring, into the first clean room, at least a portion of the first data; and
with at least the portion of the first data within the first clean room,
executing the query on at least the portion of the first data within the first clean room;
identifying a plurality of results in response to the query within the first clean room;
enforcing anonymity on at least some of the plurality of results within the first clean room, wherein enforcing anonymity on the at least some of the plurality of results comprises replacing a specific value of one of the at least some of the plurality of results with one of:
a general value; or
a value within a category of the specific value; and
after enforcing anonymity on the at least some of the plurality of results within the first clean room,
executing at least one action using the at least some of the plurality of results within the first clean room.

2. The advertising system of claim 1, wherein the first advertiser is one of:
a direct advertiser of a brand associated with the at least one of the good or the service; or
an advertising agency associated with a plurality of brands, wherein one of the brands is associated with the at least one of the good or the service.

3. A method comprising:
causing presentations of at least a first advertisement of a first advertiser to a first plurality of viewers in at least a first format, wherein the first advertisement is associated with at least one of a good or a service associated with the first advertiser;
identifying first data regarding the presentations of at least the first advertisement to the first plurality of viewers, wherein the first data includes at least:
conversion events attributed to the first advertisement by at least one of the first plurality of viewers;
impressions of the first advertisement by the at least one of the first plurality of viewers;
selections of information regarding the at least one of the good or the service by the at least one of the first plurality of viewers; and
views of information regarding the at least one of the good or the service by the at least one of the first plurality of viewers;
identifying a query associated with at least one of the first advertiser or the first advertisement;
transferring at least a portion of the first data into a first clean room of the first advertiser, wherein the first clean room is a system comprising a container for data associated with the first advertiser and at least one computer processor for executing one or more processes on data associated with the first advertiser;
with at least the portion of the first data within the first clean room,
executing the query on at least the portion of the first data by the at least one computer processor of the first clean room;

identifying a plurality of results in response to the query by the at least one computer processor of the first clean room;

enforcing anonymity on at least some of the plurality of results by the at least one computer processor of the first clean room, wherein enforcing anonymity on the at least some of the plurality of results comprises replacing a specific value of one of the at least some of the plurality of results with one of:
  a general value; or
  a value within a category of the specific value; and
after enforcing anonymity on the at least some of the plurality of results,
  executing at least one action using that least some of the anonymized results.

4. The method of claim 3, further comprising:
transferring the at least some of the anonymized results out of the first clean room; and
providing the at least some of the anonymized results to the first advertiser.

5. The method of claim 3, wherein enforcing anonymity on the at least some of the plurality of results comprises:
modifying the query to include at least one aggregation operator for counting distinct identities by the at least one computer processor of the first clean room;
identifying a threshold number of distinct identities based at least in part on the modified query by the at least one computer processor of the first clean room; and
determining that a number of distinct identities contributing to each of the plurality of results exceeds the threshold number by the at least one computer processor of the first clean room,
wherein the at least one action is executed using the at least some of the anonymized results in response to determining that the number of distinct identities contributing to each of the plurality of results exceeds the threshold number.

6. The method of claim 3, wherein enforcing anonymity on the at least some of the plurality of results comprises:
modifying the query to include at least one aggregation operator for counting distinct identities by the at least one computer processor of the first clean room;
identifying a threshold number of distinct identities based at least in part on the modified query by the at least one computer processor of the first clean room; and
determining that a number of distinct identities contributing to each of the plurality of results does not exceed the threshold number by the at least one computer processor of the first clean room; and
in response to determining that the number of distinct identities contributing to each of the plurality of results does not exceed the threshold number,
  redacting the first result from the plurality of results by the at least one computer processor of the first clean room,
wherein the anonymized results do not include the first result.

7. The method of claim 3, wherein the plurality of results comprises identifiers of a plurality of customers, and
wherein executing the at least one action using the at least some of the anonymized results comprises:
causing presentations of at least one of the first advertisement or a second advertisement to a second plurality of viewers in at least one of the first format or a second format,
wherein the second plurality of viewers are customers included in the at least some of the anonymized results.

8. The method of claim 3, wherein the query comprises an aggregate function.

9. The method of claim 3, wherein identifying the query associated with at least one of the first advertiser or the first advertisement comprises:
receiving, from the first advertiser, information regarding the query via at least one user interface provided on a computer system associated with the first advertiser,
wherein the information regarding the query comprises at least one term to be included in a structured query language query.

10. The method of claim 3, wherein identifying the query associated with at least one of the first advertiser or the first advertisement comprises:
causing a display of a plurality of templates via at least one user interface provided on a computer system associated with the first advertiser, wherein each of the plurality of templates represents a query requiring at least one term;
receiving a selection of one of the plurality of templates from the first advertiser via the at least one user interface; and
receiving the at least one term from the first advertiser via the at least one user interface.

11. The method of claim 3, wherein the first format is one of:
a display of the first advertisement on a first network page, wherein the first network page is associated with a marketplace;
a display of the first advertisement on a second network page, wherein the second network page is not associated with a marketplace; or
a display of the first advertisement in a video program.

12. The method of claim 3, wherein the first data comprises at least one of:
categories for each of the conversion events;
dates and times of each of the conversion events;
dates and times of each of the impressions;
dates and times of each of the selections;
dates and times of each of the views;
descriptions of each of the conversion events;
identifiers of at least one of a good or a service associated with each of the conversion events;
numbers of purchases of items resulting from each of the conversion events; and
prices of the at least one of the good or the service associated with each of the conversion events.

13. The method of claim 3, further comprising:
receiving second data regarding presentations of at least a second advertisement of the first advertiser to a first plurality of viewers, wherein the second data is received from the first advertiser and includes at least:
  conversion events for the at least one of a good or a service attributed to the second advertisement by at least one of the second plurality of viewers;
  impressions of the second advertisement by the at least one of the first plurality of viewers;
  selections of information regarding the at least one of the good or the service attributed to the second advertisement by the at least one of the second plurality of viewers; and
  views of information regarding the at least one of the good or the service attributed to the second advertisement by the at least one of the second plurality of viewers; and
transferring at least a portion of the second data into the first clean room, wherein the query is executed on at least the portion of the first data and the portion of the second data.

14. The method of claim 3, wherein at least the first data is stored in at least one computer system comprising a first instance associated with the first advertiser,
    wherein the first instance comprises a first data broker and the first clean room,
    wherein the first clean room comprises a first data store and a first compute component, and
    wherein the first data broker is configured to map data regarding interactions and advertisements to the first advertiser and to transfer at least the first data into the first data store.

15. The method of claim 14, wherein the at least one computer system comprises a plurality of instances,
    wherein the first instance is one of the plurality of instances,
    wherein each of the plurality of instances is associated with one of a plurality of advertisers,
    wherein the first advertiser is one of the plurality of advertisers,
    wherein each of the plurality of instances comprises a data broker and a clean room,
    wherein each of the clean rooms comprises a data store and a compute component, and
    wherein each of the data brokers is configured to map data regarding interactions and advertisements to one of the plurality of advertisers.

16. The method of claim 3, wherein the each of the conversion events, impressions, selections or views is keyed to one of the plurality of advertisers,
    wherein each of the advertisements is keyed to one of the plurality of advertisers, and
    wherein identifying the first data comprises:
        identifying the conversion events, impressions, selections or views keyed to the first advertiser; and
        identifying the advertisements keyed to the first advertiser.

17. The method of claim 3, wherein the first advertiser is one of:
    a direct advertiser of a brand associated with the at least one of the good or the service; or
    an advertising agency associated with a plurality of brands, wherein one of the brands is associated with the at least one of the good or the service.

18. The method of claim 3, wherein each of the conversion events is one of:
    an addition of the at least one of the good or the service to a registry;
    an addition of the at least one of the good or the service to a wish list;
    a viewing of a detail page regarding the at least one of the good or the service;
    a purchase of the at least one of the good or the service; or
    a review of the at least one of the good or the service provided by a customer.

19. A method comprising:
    establishing, by an advertising service, a first instance for a first advertiser of the advertising service, wherein the first instance comprises a first data broker and a first clean room, wherein the first clean room comprises a first data store and a first compute component associated with the first advertiser, wherein the first compute component is configured to execute one or more processes on data associated with the first advertiser within the first clean room, and wherein the first data broker is configured to map data regarding interactions and advertisements to the first advertiser;
    transferring, by the advertising service, first data associated with interactions of customers of the first advertiser with advertisements presented to prospective customers by the first advertiser to the first data store of the first clean room;
    determining that a second advertiser has accepted an invitation to be a participant in the first clean room;
    in response to determining that the second advertiser has accepted the invitation to be a participant in the first clean room,
        transferring, by the advertising service, second data associated with interactions of customers of the second advertiser with advertisements presented to prospective customers by the second advertiser to the first data store of the first clean room;
    identifying, by the advertising service, a query from a first advertiser, wherein the query is to be executed on the first data and second data;
    determining that the first advertiser has permission to execute the query on the second data; and
    in response to determining that the first advertiser has permission to execute the query on the second data,
        executing the query on at least some of the first data and the second data by the first compute component;
        identifying results to the query by the first compute component; and
        executing at least one action based at least in part on at least some of the results to the query by the first compute component.

20. The method of claim 19, wherein executing the at least one action based at least in part on the results to the query comprises:
    enforcing anonymity on the at least some of the results by the first compute component, wherein enforcing anonymity on the at least some of the plurality of results comprises replacing a specific value of one of the at least some of the at least some of the plurality of results with one of:
    a general value; or
    a value within a category of the specific value; and
    after enforcing anonymity on the at least some of the plurality of results,
        providing at least the anonymized results to the first advertiser.

* * * * *